(12) United States Patent
Krishnan et al.

(10) Patent No.: US 10,459,984 B2
(45) Date of Patent: *Oct. 29, 2019

(54) APPARATUS AND METHOD FOR DISPLAYING MULTIPLE DISPLAY PANELS WITH A PROGRESSIVE RELATIONSHIP USING COGNITIVE PATTERN RECOGNITION

(71) Applicant: ImageScan, Inc., Pasadena, CA (US)

(72) Inventors: Basker S. Krishnan, San Marino, CA (US); Hanoz J. Kateli, Monrovia, CA (US); Bryan Heesch, Pasadena, CA (US)

(73) Assignee: Imagescan, Inc., Pasadena, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 15/678,932

(22) Filed: Aug. 16, 2017

(65) Prior Publication Data
US 2018/0011847 A1    Jan. 11, 2018

Related U.S. Application Data

(63) Continuation of application No. 13/305,665, filed on Nov. 28, 2011, now Pat. No. 9,772,999, which is a
(Continued)

(51) Int. Cl.
*G06F 17/30* (2006.01)
*G06F 16/93* (2019.01)
(Continued)

(52) U.S. Cl.
CPC ............ *G06F 16/93* (2019.01); *G06F 16/338* (2019.01); *G06F 16/34* (2019.01)

(58) Field of Classification Search
CPC .......... G06F 16/338; G06F 16/34; G06F 16/93
See application file for complete search history.

(56) References Cited

U.S. PATENT DOCUMENTS

| 5,771,378 A | 6/1998 | Holt et al. |
| 6,741,985 B2 | 5/2004 | Green |
(Continued)

OTHER PUBLICATIONS

Word 2010 Features and Benefits.
(Continued)

*Primary Examiner* — Mark D Featherstone
*Assistant Examiner* — Navneet Gmahl
(74) *Attorney, Agent, or Firm* — Alonzo & Associates; Arlyn Alonzo

(57) ABSTRACT

An apparatus and method for searching and displaying using cognitive pattern recognition including searching for document(s) with at least one search text, wherein each search text is associated with a highlight option; selecting to enable or disable the highlight option for each of the search text; displaying a progressive relationship of the document(s) in scaled common image format (CIF) by displaying: a first display presenting the document(s), wherein each of the document(s) includes all of the search text; a second display presenting only pages from the document(s) where the only pages presented include one or more of the search text with its associated highlight option enabled; and a third display presenting one page from the only pages wherein all occurrences of the search text where the highlight option for the search text is enabled are displayed simultaneously on the page.

44 Claims, 12 Drawing Sheets

Related U.S. Application Data continuation-in-part of application No. 13/280,281, filed on Oct. 24, 2011.

(51) Int. Cl.
*G06F 16/34* (2019.01)
*G06F 16/338* (2019.01)

(56) References Cited

U.S. PATENT DOCUMENTS

| | | |
|---|---|---|
| 6,834,276 B1 | 12/2004 | Jensen et al. |
| 7,373,612 B2 | 5/2008 | Risch et al. |
| 7,596,574 B2 | 9/2009 | Sweeney |
| 7,644,373 B2 | 1/2010 | Jing et al. |
| 7,689,933 B1 | 3/2010 | Parsons |
| 7,870,130 B2 | 1/2011 | Banerjee et al. |
| 8,935,290 B2 | 1/2015 | Ippili et al. |
| 2003/0167279 A1 | 9/2003 | Smiga et al. |
| 2003/0195980 A1 | 10/2003 | Geshwind |
| 2004/0054967 A1 | 3/2004 | Brandenberger |
| 2004/0093331 A1 | 5/2004 | Garner et al. |
| 2004/0095376 A1 | 5/2004 | Graham et al. |
| 2005/0108001 A1 | 5/2005 | Aarskog |
| 2006/0047651 A1 | 3/2006 | Milic-Frayling et al. |
| 2006/0133699 A1 | 6/2006 | Widrow et al. |
| 2007/0011149 A1 | 1/2007 | Walker |
| 2007/0083552 A1 | 4/2007 | Allen et al. |
| 2007/0233692 A1 | 10/2007 | Lisa et al. |
| 2008/0010251 A1 | 1/2008 | Fontoura et al. |
| 2008/0065636 A1 | 3/2008 | Miller et al. |
| 2008/0097984 A1 | 4/2008 | Candelore |
| 2008/0098432 A1 | 4/2008 | Hardacker et al. |
| 2008/0148147 A1 | 6/2008 | Poston et al. |
| 2009/0094238 A1 | 4/2009 | Banerjee et al. |
| 2009/0158181 A1 | 6/2009 | Becerra et al. |
| 2009/0183115 A1 | 7/2009 | Iwasaki |
| 2009/0216736 A1 | 8/2009 | Dexter et al. |
| 2009/0228777 A1 | 9/2009 | Henry et al. |
| 2009/0313352 A1 | 12/2009 | Dupont |
| 2010/0246884 A1 | 9/2010 | Chen et al. |
| 2010/0299201 A1 | 11/2010 | Thrasher |
| 2010/0332515 A1 | 12/2010 | Carraher et al. |
| 2011/0035383 A1 | 2/2011 | Ghimire |
| 2011/0246453 A1 | 6/2011 | Krishnan et al. |
| 2011/0218990 A1 | 9/2011 | Jordahl |
| 2011/0258049 A1 | 10/2011 | Ramer et al. |
| 2013/0103707 A1 | 4/2013 | Krishnan et al. |
| 2013/0124515 A1 | 5/2013 | Ghimire |

OTHER PUBLICATIONS

Adobe Acrobat 9 Standard Advanced Search Options.
Adobe Acrobat 9 Standard Find Text in a PDF.
Adobe Acrobat 9 Standard Find Text in multiple PDFs.
Adobe Acrobat 9 Standard Search Features Overview.
Thomas Macentee: "Google Books for Genealogy", Sep. 3, 2011, pp. 1-7, XP055188474, retrieved from Internet: URL:http://web.archive.org/web/20110903063944/http://www.archives.com/experts/macentee-thomas/google-books-for-genealogy.html [retrieved May 11, 2015].
Anonymous: "efTwo (F2) Finds Multiple Words & Their Inflections on a page [Chrome]", Aug. 10, 2011, pp. 1-6, XP055407982, retrieved from the Internet : URL:http://web.archive.org/web/20110810224803/https://www.additivetips.com/internet-tips/eftwo-f2-finds-multiple-words-their-inflections-on-a-page-chrome/ [retrieved on Sep. 19, 2017].

FIG. 14c

APPARATUS AND METHOD FOR DISPLAYING MULTIPLE DISPLAY PANELS WITH A PROGRESSIVE RELATIONSHIP USING COGNITIVE PATTERN RECOGNITION

CLAIM OF PRIORITY UNDER 35 U.S.C. § 120

The present Application for Patent is a continuation of patent application Ser. No. 13/305,665 entitled Apparatus and Method for Displaying Multiple Display Panels With a Progressive Relationship Using Cognitive Pattern Recognition, filed on Nov. 28, 2011 which is a continuation in part of patent application Ser. No. 13/280,281 entitled "Apparatus and Method for Displaying Search Results Using Cognitive Pattern Recognition in Locating Documents and Information Within" filed Oct. 24, 2011, pending, and assigned to the assignee hereof and hereby expressly incorporated by reference herein.

FIELD

This disclosure relates generally to apparatus and methods for visual presentation of search results. More particularly, the disclosure relates to visually presenting search results to enable use of cognitive pattern recognition.

BACKGROUND

In current document files, it is known that many documents with similar or even identical words exist. Thus, with the commonality of words and phrases in different documents or even different versions of the documents, it is time consuming to find an exact document quickly and efficiently. Often, a keyword search could produce a list of many documents with the same word and even include all the various versions of the different documents containing the keyword. This is especially problematic if the keyword used in the search is a common word for a particular application.

SUMMARY

Disclosed is an apparatus and method for searching and displaying results using cognitive pattern recognition. According to one aspect, a method for searching and displaying using cognitive pattern recognition including searching for at least one document with at least one search text, wherein each of the at least one search text is associated with a highlight option; selecting to enable or to disable the highlight option for each of the at least one search text; displaying a progressive relationship of the at least one document in scaled common image format (CIF), wherein displaying the progressive relationship includes displaying the following: a first display presenting the at least one document, wherein each of the at least one document includes all of the at least one search text; a second display presenting only pages from the at least one document where the only pages presented include one or more of the at least one search text with its associated highlight option enabled; and a third display presenting one page from the only pages wherein all occurrences of the search text where the highlight option for the search text is enabled are displayed simultaneously on the page.

According to another aspect, an apparatus for searching and displaying using cognitive pattern recognition, the apparatus comprising a processor and a memory, the memory containing program code executable by the processor for performing the following: searching for at least one document with at least one search text, wherein each of the at least one search text is associated with a highlight option; selecting to enable or to disable the highlight option for each of the at least one search text; displaying a progressive relationship of the at least one document in scaled common image format (CIF), wherein displaying the progressive relationship includes displaying the following: a first display presenting the at least one document, wherein each of the at least one document includes all of the at least one search text; a second display presenting only pages from the at least one document where the only pages presented include one or more of the at least one search text with its associated highlight option enabled; and a third display presenting one page from the only pages wherein all occurrences of the search text where the highlight option for the search text is enabled are displayed simultaneously on the page.

Advantages of the present disclosure may include reducing the steps and time needed to search for an object (e.g., a document) or information within the object. Another advantage may include increased accuracy and built in fault tolerance, for example, for OCR (optical character recognition) errors and misfiles in locating an object or information within the object.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIGS. 14a-c illustrate an example of a set of documents displayed from a search result in accordance with the three displays described in FIG. 12.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

A search may be based on not just words contained in a document, but also the user's memory of a visual image of the document and/or the approximate date of the document. For example, different documents or versions of a same document may contain many identical keywords. However, the visual presentation (i.e., display) of the first page (or any other page) of different documents or types of documents may differ. Thus, there's a need for a search & display approach that can utilize the aspects of keyword searching and visual presentation (i.e., display) of the document being searched to quickly and efficiently locate the document in a document repository (e.g., database.). For example, the human brain can quickly identify the visual pattern of a needed document(s) using cognitive pattern recognition (CPR), and distinguish between like document patterns using meta data tags displayed alongside the document display in scaled CIF. One skilled in the art would understand that a document repository may include an electronic repository or an electronic database.

Figure 1:
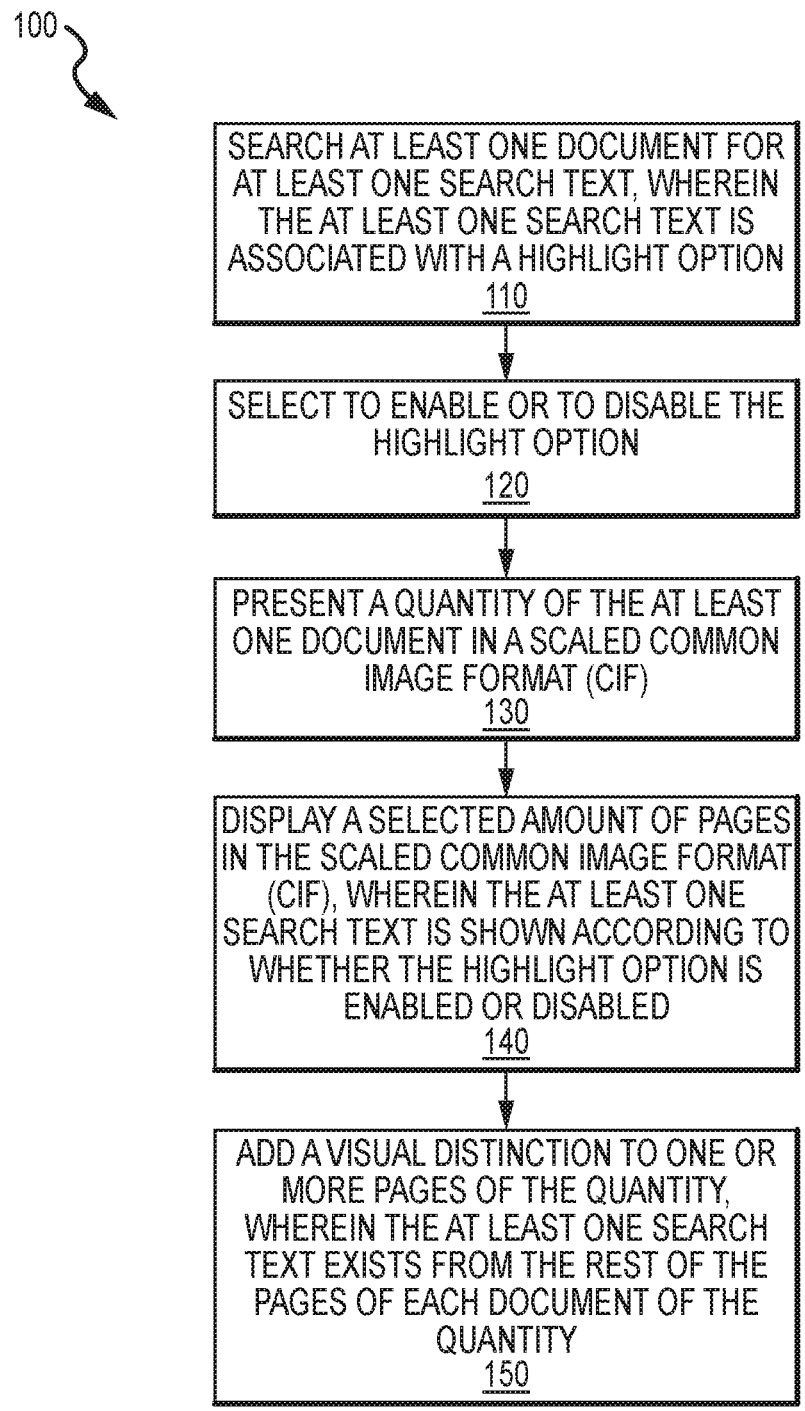
FIG. 1 illustrates a first example of a flow diagram for searching and displaying results using cognitive pattern recognition.

FIG. 1 illustrates a first example of a flow diagram 100 for searching and displaying results using cognitive pattern recognition. In block 110, search at least one document for at least one search text, wherein the at least one search text is associated with a highlight option. In one example, the highlight option allows a user to determine which search text should be differentiated from the remaining text of a document when the search text found within the document. The differentiation allows a user to quickly distinguish the search text from the rest of the remaining text. In one example, the search text with the highlight option enabled is differentiated from the remaining text of the document in one or more of the following manner: highlighted by a different color (i.e., color differentiation), bolded, italicized, underlined, etc. One skilled in the art would understand that the list of ways to "differentiate" a text from the remaining text as presented herein is not an exclusive list and that other manners of differentiating a search text may be part of the highlight option without affecting the scope and/or spirit of the present disclosure.

In one example, the highlight option includes a color differentiation (e.g., a yellow color) added to a search text. In another example, the highlight option includes varying the fonts, the mark-ups, or an added visual distinction to the search text. In yet another example, the highlight option includes adding a border around the search text. One skilled in the art would understand that the examples listed of the highlight option are not limiting and that other examples of differentiating a search text from the rest of the text on a page of a document are within the spirit and scope of the present disclosure.

In one aspect, different search text may be associated with different highlight options. For example, a first search text may be highlighted in yellow while a second search text may be bolded. One skilled in the art would understand that multiple search text may be associated with different highlight options, that is, with different examples of distinguishing the multiple search text from each.

A "search text" as used in the present disclosure may be a single word, a collection of words (i.e., a phrase of contiguous words), a symbol, a regular expression, a number, a special character and/or any combination thereof. In one aspect, the at least one search text comprises multiple search text to be searched concurrently with one or more documents. In one example, a search text is a keyword, a date or date range, a meta data, etc.

In one aspect, the at least one document is searched based on one or more of the following: an attribute, an attribute range or a special definition. For example, an attribute may be a significant identifier such as a social security number and the search might involve a single, multiple (within a range) or all SSNs within documents in a repository. For example, an attribute may be a special symbol or a special character. For example, an attribute range may be all dates within a specified range (e.g., from Jan. 1, 2000-Dec. 30, 2010). For example, an attribute range may be all amounts found within a range (e.g., $50,000 to $100,000 or 1 liter to 1000 liters, etc.) within documents. In one aspect, the special definition may be a list of predefined synonyms. In another aspect, the special definition may be a list of antonyms.

Following block 110, in block 120, select to enable or to disable the highlight option. In one example, the highlight option associated with one search text is enabled, such that, for example, the search text would be highlighted in yellow each time it occurs on a page of a document of a repository or database. In one example, the repository is the Internet. In another example, the repository is a private database. In one example with multiple search text, each of the search text is associated with a highlight option which may be enabled or disabled. And, in another example, multiple search text with their highlight option enabled may be differentiated differently (i.e., distinctly) from each other. For example, a first search text with its highlight option enabled may be bolded, a second search text with its highlight option enabled may be underlined, a third search text with its highlight option enabled may be italicized. And, another search text may have its highlight option disabled such that it is not differentiated from the remaining text (non-searched text) of the document.

In block 130, present a quantity of the at least one document in a scaled common image format (CIF). One skilled in the art would understand that presenting a quantity of the at least one document (as defined in block 130) may include presenting one or more documents.

In one aspect, (CIF) is a digital representation of a document which retains the look and feel of the document in a printed form or it is a visual representation of the pages within digitally converted paper or electronically created documents. In one example, the first page of each of the quantity of the searched documents is presented in the scaled common image format (CIF). In one example, a first page of each of the quantity of the searched documents is presented in the scaled common image format (CIF). In one example, the presenting of the quantity is done in a predetermined order. And, in one example, the predetermined order is based on a meta data parameter. In one aspect, at least one meta data parameter is presented along with the scaled common image format (CIF). In another aspect, a portion of a meta data parameter is presented along with the scaled common image format (CIF). In one example, the meta data parameter is modified before being presented. In one aspect, the at least one meta data parameter is a date information. The date information, for example, may be a date the document is created, a date contained within the document, a date the document is processed, such as scanned, or a date assigned to the document, etc.

Following block 130, in block 140, display a selected amount of pages in the scaled common image format (CIF), wherein the at least one search text is shown according to whether the highlight option is enabled or disabled. In one example, the selected amount is the pages wherein the at least one search text exists on each of the pages and wherein the search text is presented with the highlight option enabled. In one example, the selected amount is a chosen quantity of pages, and may range, for example, from a single page to multiple pages. In one example, the selected amount of pages is from a single document.

Following block 140, in block 150, add a visual distinction to one or more pages of the quantity where the at least one search text exists from the rest of the pages of each document of the quantity. In one example, the selected amount includes all the pages with the added visual distinction. In one example, the selected amount is from a single document.

One skilled in the art would understand that although the steps in blocks 110 through 150 are written in a particular order (the step in block 150 follows the step in block 140 which follows the step in block 130 which follows the step in block 120 which follows the step in block 110), the order of the steps may be interchanged without affecting the scope or spirit of the present disclosure. In one aspect, some of the steps in FIG. 1 are performed by a computer, such as a personal computer. In another aspect, some of the steps in FIG. 1 are performed by a handheld device that incorporates at least one processor.

Figure 2:
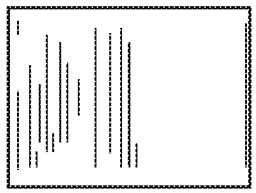
FIG. 2 illustrates a first example of pages of at least one or more document where the search text exists wherein a highlight option is disabled.
Figure 2:
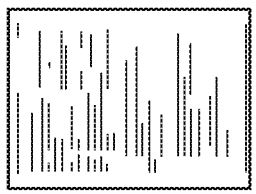
Figure 2:
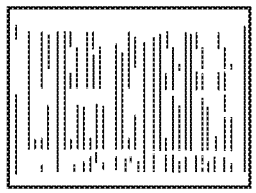
Figure 2:
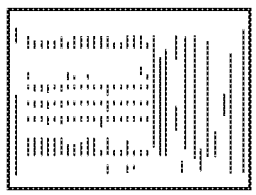
Figure 2:
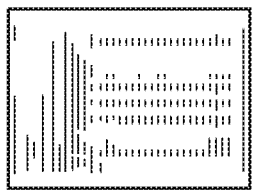
Figure 2:
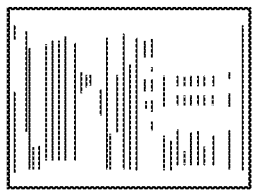
Figure 2:
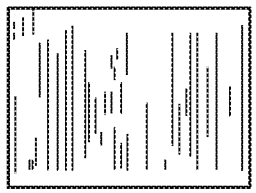
Figure 3:
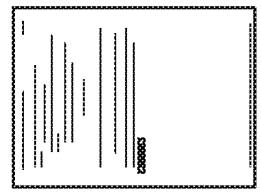
FIG. 3 illustrates a first example of pages of at least one or more document where the search text exists wherein a highlight option is enabled.
Figure 3:
Figure 3:
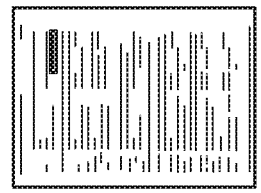
Figure 3:
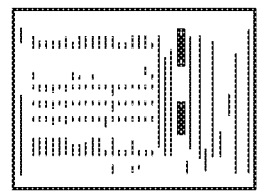
Figure 3:
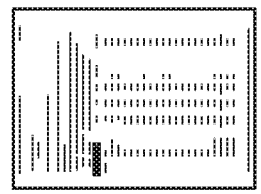
Figure 3:
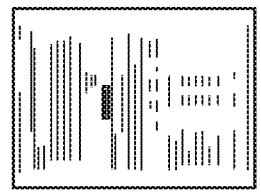
Figure 3:
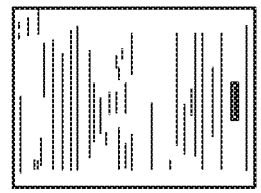

FIG. 2 illustrates a first example of pages of at least one or more document where the search text exists. In this example of FIG. 2, the highlight option of the search text is disabled. FIG. 3 illustrates a second example of pages of at least one or more document where the search text exists. In this example of FIG. 3, the highlight option of the search text is enabled.

Figure 4:
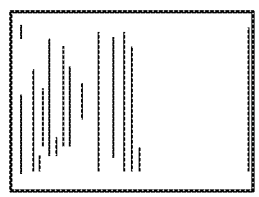
FIG. 4 illustrates the first example of FIG. 2 where some of the pages are presented with a visual distinction (i.e., in a different format) than the rest of the pages.
Figure 4:
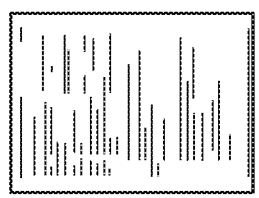
Figure 4:
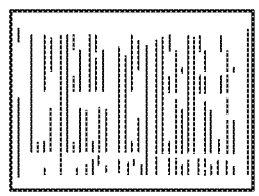
Figure 4:
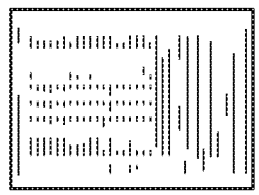

FIG. 4 illustrates the first example of FIG. 2 where some of the pages are presented with a visual distinction (i.e., in a different format) than the rest of the pages. As illustrated in FIG. 4, the second and third pages are presented with borders. In one aspect, a user determines whether some of the pages are to be presented in the different format. Furthermore, the user may determine what the different format should be, for example, in using borders or some other different formatting. And, the user may determine the one or more criteria for some of the pages to be presented in the different format. One skilled in the art would understand that other forms of different formats, not limited to borders as illustrated herein, may be used without restricting the scope and spirit of the present disclosure.

Figure 5:
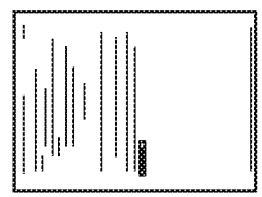
FIG. 5 illustrates the second example of FIG. 3 where some of the pages are presented with a visual distinction (i.e., in a different format) than the rest of the pages.
Figure 5:
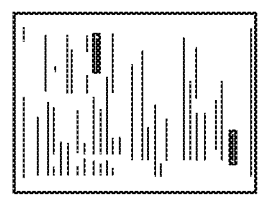
Figure 5:
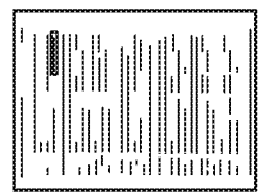
Figure 5:
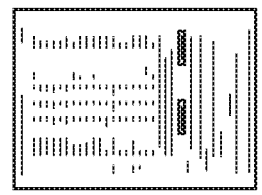

FIG. 5 illustrates the second example of FIG. 3 where some of the pages are presented with a visual distinction (i.e., in a different format) than the rest of the pages. As illustrated in FIG. 5, the second and third pages are presented with borders where the highlight search text is found. In one aspect, a user determines whether some of the pages are to be presented in the different format. Furthermore, the user may determine what the different format should be, for example, in using borders or some other different formatting. And, the user may determine the one or more criteria for some of the pages to be presented in the different format. One skilled in the art would understand that other forms of different formats, not limited to borders as illustrated herein, may be used without restricting the scope and spirit of the present disclosure.

In one aspect, cognitive pattern recognition is based on prior cognitive knowledge. For example, recognition is based on a collective memory about the document being searched. The cognition pattern being recognized may be based on memory of one or more of the following: file format (e.g., Word, Excel etc.), approximate date of the document (last month, last quarter, last year etc.), from and to details on correspondence/email/fax, keywords within documents, key sections within documents (e.g., pricing details within a proposal or termination clause within a contract); memory of how various digital file formats look.

In another example, recognition is based on cognitive intelligence. For example, the search is for a document that one is not familiar with, however aspects of the document are known to the searcher. In one example, the search is for a tax form, a court document or a lab report, etc, wherein each has its unique image pattern that is easily recognizable. In another example, the location of the search text (e.g., highlighted keyword(s)) within a page in common image format allows cognitive pattern recognition. Based on common image format (e.g., miniature visual display) of documents containing highlighted keyword(s), one can quickly recognize and comprehend the relevance of various documents like Correspondence, Presentations, Proposals Cost Estimates for Cleanup etc. as events on a time line or as a relevant document pertaining to an issue.

One skilled in the art would understand that the steps disclosed in the example flow diagram in FIG. 1 may be interchanged in their order without departing from the scope and spirit of the present disclosure. Also, one skilled in the art would understand that the steps illustrated in the flow diagrams are not exclusive and other steps may be included or one or more of the steps in the example flow diagrams may be deleted without affecting the scope and spirit of the present disclosure.

One skilled in the art would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise memory stick, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
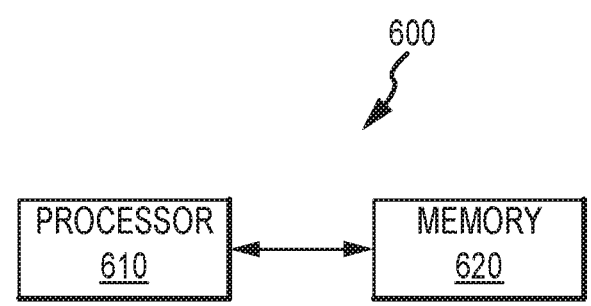
FIG. 6 illustrates an example of a device comprising a processor in communication with a memory for executing the algorithms in the flow diagrams illustrated in FIGS. 1 and 12.

In one example, the illustrative components, flow diagrams, logical blocks, modules and/or algorithm steps described herein are implemented or performed with one or more processors. In one aspect, a processor is coupled with a memory which stores data, meta data, program instructions, etc. to be executed by the processor for implementing or performing the various flow diagrams, logical blocks and/or modules described herein. FIG. 6 illustrates an example of a device 600 comprising a processor 610 in communication with a memory 620 for executing the algorithms in the flow diagrams illustrated in FIGS. 1 and 12. In one aspect, the memory 620 is located within the processor 610. In another aspect, the memory 620 is external to the processor 610. In one aspect, the processor includes circuitry for implementing or performing the various flow diagrams, logical blocks and/or modules described herein.

Figure 7:
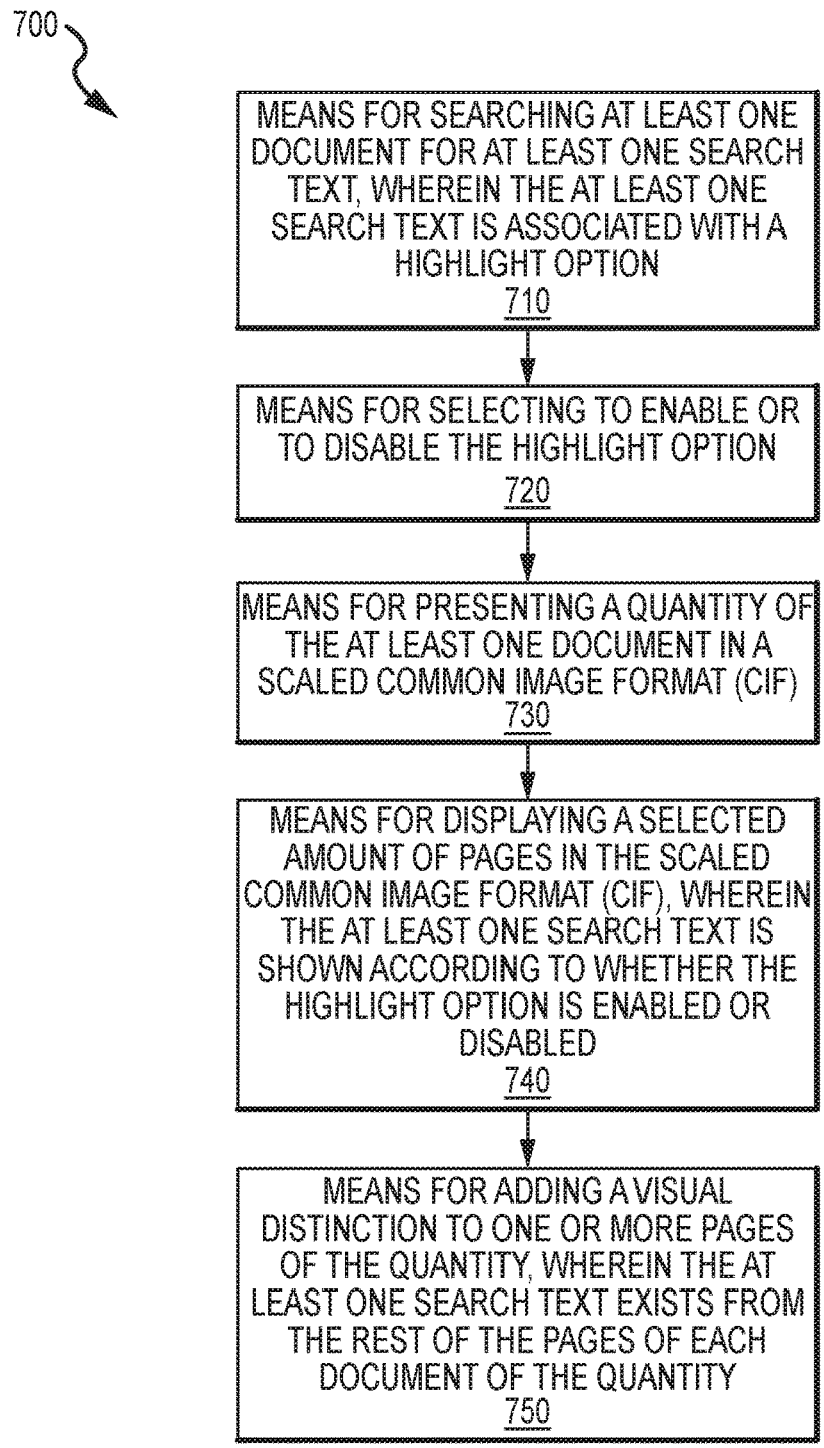
FIG. 7 illustrates an example of a device suitable for searching and displaying results using cognitive pattern recognition in the flow diagram illustrated in FIG. 1.

FIG. 7 illustrates an example of a device 700 suitable for searching and displaying results using cognitive pattern recognition in the flow diagram illustrated in FIG. 1. In one aspect, the device 700 is implemented by at least one processor comprising one or more modules configured to search using cognitive pattern recognition as described herein in blocks 710, 720, 730, 740 and 750. For example, each module comprises hardware, firmware, software, or any combination thereof. In one aspect, the device 700 is also implemented by at least one memory in communication with the at least one processor.

Figure 8:
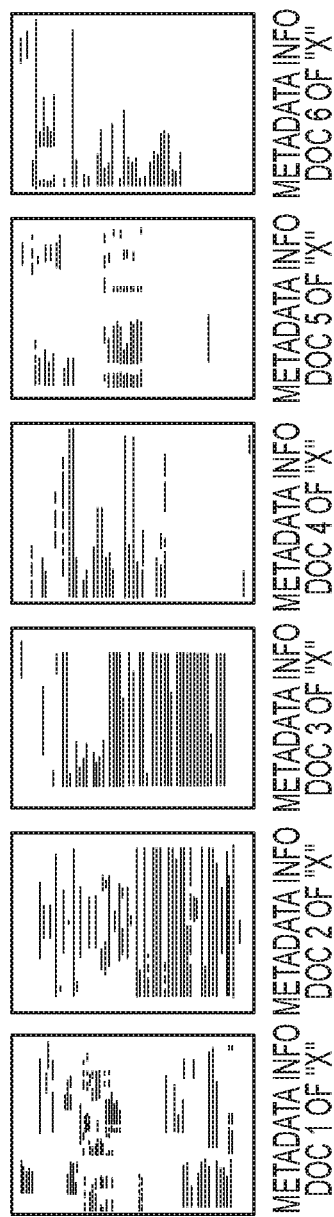
FIG. 8 illustrates a first example of a set of documents displayed from a search result.

FIG. 8 illustrates a first example of a set of documents displayed from a search result. In this first example, illustrated in FIG. 8, the set of documents are displayed in a scaled common image format (CIF) with meta data information in the image tag.

Figure 9:
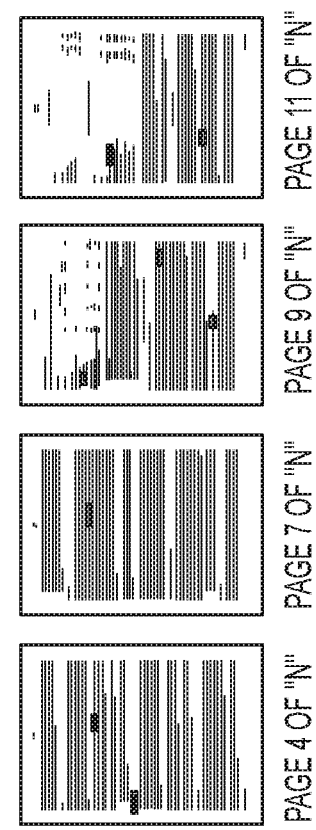
FIG. 9 illustrates a second example of a set of documents displayed from a search result.

FIG. 9 illustrates a second example of a set of documents displayed from a search result. In this second example, the set of documents may be displayed in a scaled CIF with meta data information in the image tag. For example, in FIG. 9, only the pages with the search text (e.g., keyword(s)) that are marked are displayed.

Figure 10:
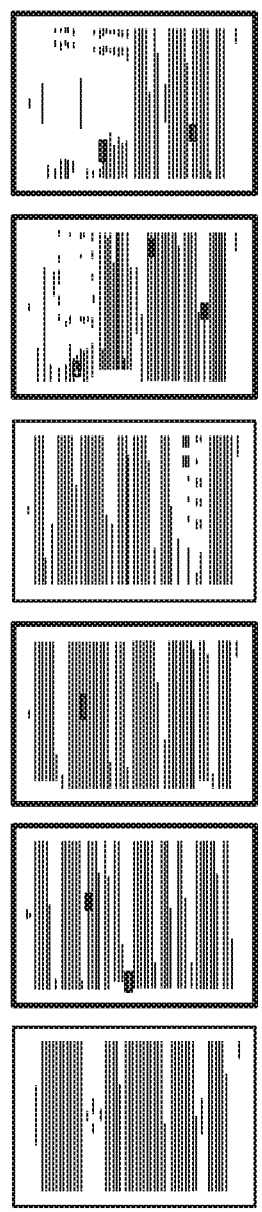
FIG. 10 illustrates a third example of a set of documents displayed from a search result.

FIG. 10 illustrates a third example of a set of documents displayed from a search result. In this third example, the set of documents may be displayed in a scaled CIF with meta data information in the image tag. For example, in FIG. 10, the pages with all the search text (e.g., keyword(s)) found are displayed. In one example, the display includes pages with the search text the highlight option enabled as well as the search text with the highlight option disabled. In one example, the search text with the highlight option enabled is displayed differently than the search text with the highlight option disabled.

Figure 11:
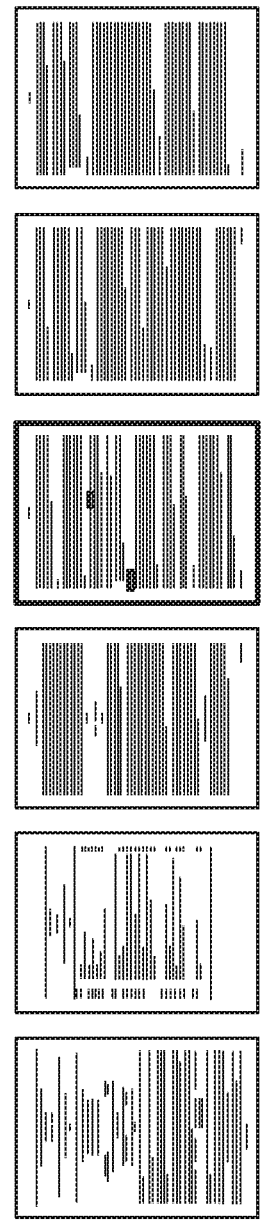
FIG. 11 illustrates a fourth example of a set of documents displayed from a search result.

FIG. 11 illustrates a fourth example of a set of documents displayed from a search result. In this fourth example, the set of documents may be displayed in a scaled CIF with meta data information in the image tag. For example, as illustrated in FIG. 11, all the pages within a document are displayed. This includes pages with the search text the highlight option enabled as well as the search text with the highlight option disabled. In one example, the search text with the highlight option enabled is displayed differently than the search text with the highlight option disabled.

Figure 12:
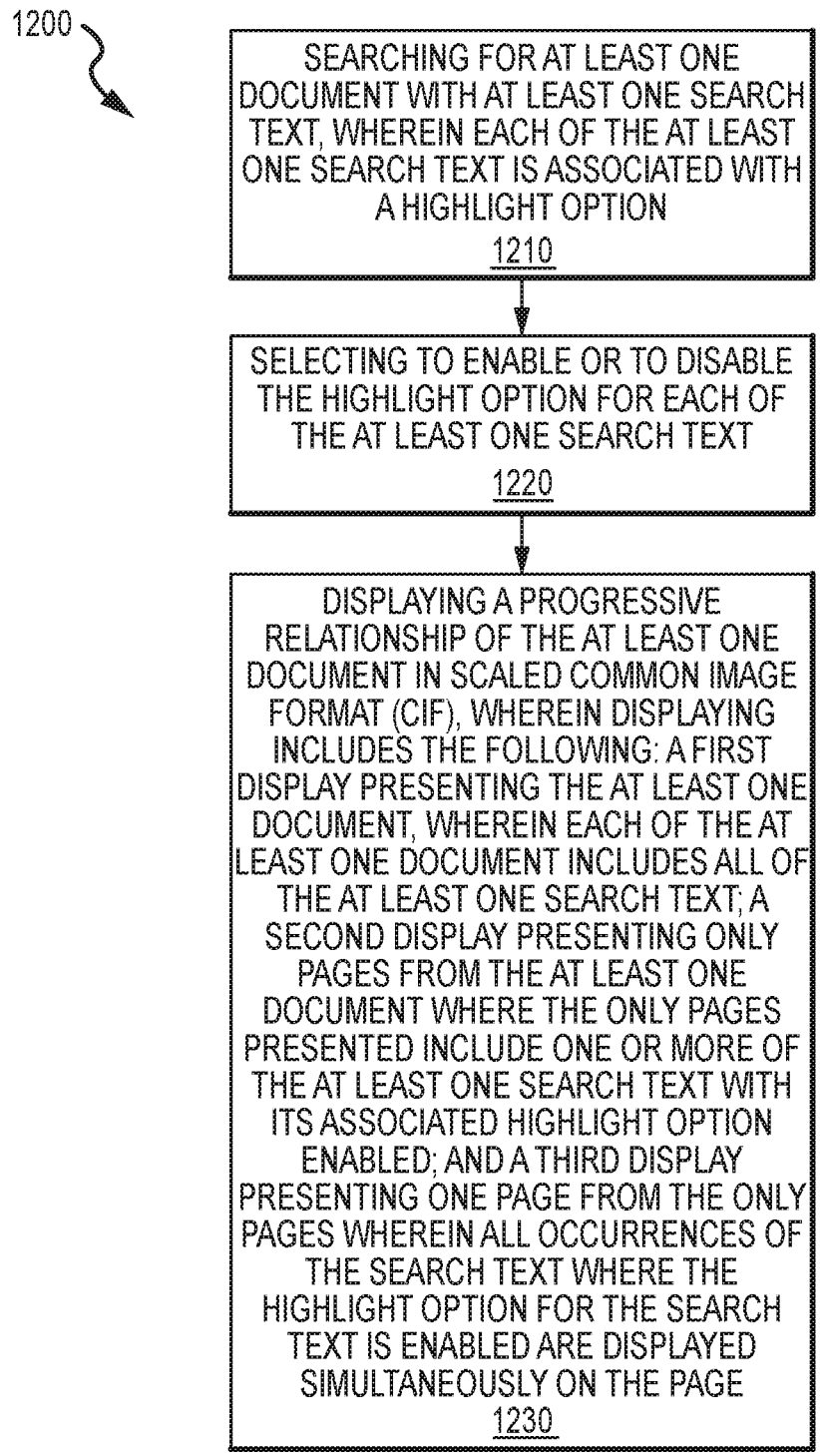
FIG. 12 illustrates a second example of a flow diagram for searching and displaying results using cognitive pattern recognition.

FIG. 12 illustrates a second example of a flow diagram 1200 for searching and displaying results using cognitive pattern recognition. In block 1210, search for at least one document with at least one search text. In one example, the at least one document is from a repository. For example, the repository is the Internet. In another example, the repository is a private database. In one example, the searching is based on one or more of the following: an attribute, an attribute range or a special definition. Some examples of an attribute, an attribute range or a special definition are presented above in the present disclosure.

In one example, each of the at least one search text is associated with a highlight option. In one example, the at least one document does not include any document with an excluded text. In one example, if a document includes an excluded text, the document is excluded from being presented in one or more of the displays. For example, if a document includes an excluded text, the document would not be presented in a display. In one aspect, an "excluded text" as used in the present disclosure may be a single word, a collection of words (i.e., a phrase of contiguous words), a symbol, a regular expression, a number, a special character and/or any combination thereof.

In block 1220, select to enable or to disable the highlight option for each of the at least one search text. In one example, the at least one search text is a multiple search text. With multiple search text, each of the search text is associated with a highlight option which may be enabled or disabled. And, in another example, multiple search text with their highlight option enabled may be differentiated differently (i.e., distinctly) from each other. For example, a first search text with its highlight option enabled may be bolded, a second search text with its highlight option enabled may be underlined, a third search text with its highlight option enabled may be italicized. And, another search text may have its highlight option disabled such that it is not differentiated from the remaining text (non-searched text) of the at least one document. In yet another option, when the highlight option is enabled, a color differentiation is added to the associated search text associated with that highlight option.

In block 1230, displaying a progressive relationship of the at least one document in scaled common image format (CIF). In one example, displaying the progressive relationship includes displaying the following: a first display presenting the at least one document, wherein each of the at least one document includes all of the at least one search text; a second display presenting only pages from the at least one document where the only pages presented include one or more of the at least one search text with its associated highlight option enabled; and a third display presenting one page from the only pages wherein all occurrences of the search text where the highlight option for the search text is enabled are displayed simultaneously on the page.

In one example, the only pages that are presented in the second display do not include any page with an excluded text. In one example, the only pages presented in the second display are all from a single document selected from the at least one document presented in the first display. For example, a user may select the single document from the at least one document. The single document may be visually differentiated in the first display from the remaining documents presented in the first display. In one example, the single document is differentiated, for example, by a border drawn around its CIF image. One skilled in the art would understand that other manners of differentiating may be used without affecting the scope and/or spirit of the present disclosure.

In one example, all of the at least one search text where the highlight option is enabled are displayed simultaneously on each of the only pages in the second display.

In one example, the one page presented in the third display is selected for presenting by a user. In another example, the one page presented in the third display is selected a priori, for example, by a predefined rule. In one example, the one page from the only pages is visually differentiated in the second display from the remaining only pages. In one example, the one page is differentiated, for example, by a border drawn around its CIF image. One skilled in the art would understand that other manners of differentiating may be used without affecting the scope and/or spirit of the present disclosure.

In one example, the at least one document presented in the first display does not include any document with a first excluded text and the only pages presented in the second display do not include any page with a second excluded text. In one example, the first excluded text is different from the second excluded text.

In one aspect, a display (such as the first display, second display and/or third display) is a collection of one or more congruent controls used for the purpose of displaying data in a cognitive format. In one example, a display is a partial or complete display area supported by a device using the viewing application. For example, it may be a single display panel or multiple display panels connected to the device. In one example, a display is a viewable area on a computer monitor. And, in one example, multiple displays may include sub dividing the same viewable area into multiple adjacent sub areas or display panels.

Figure 13:
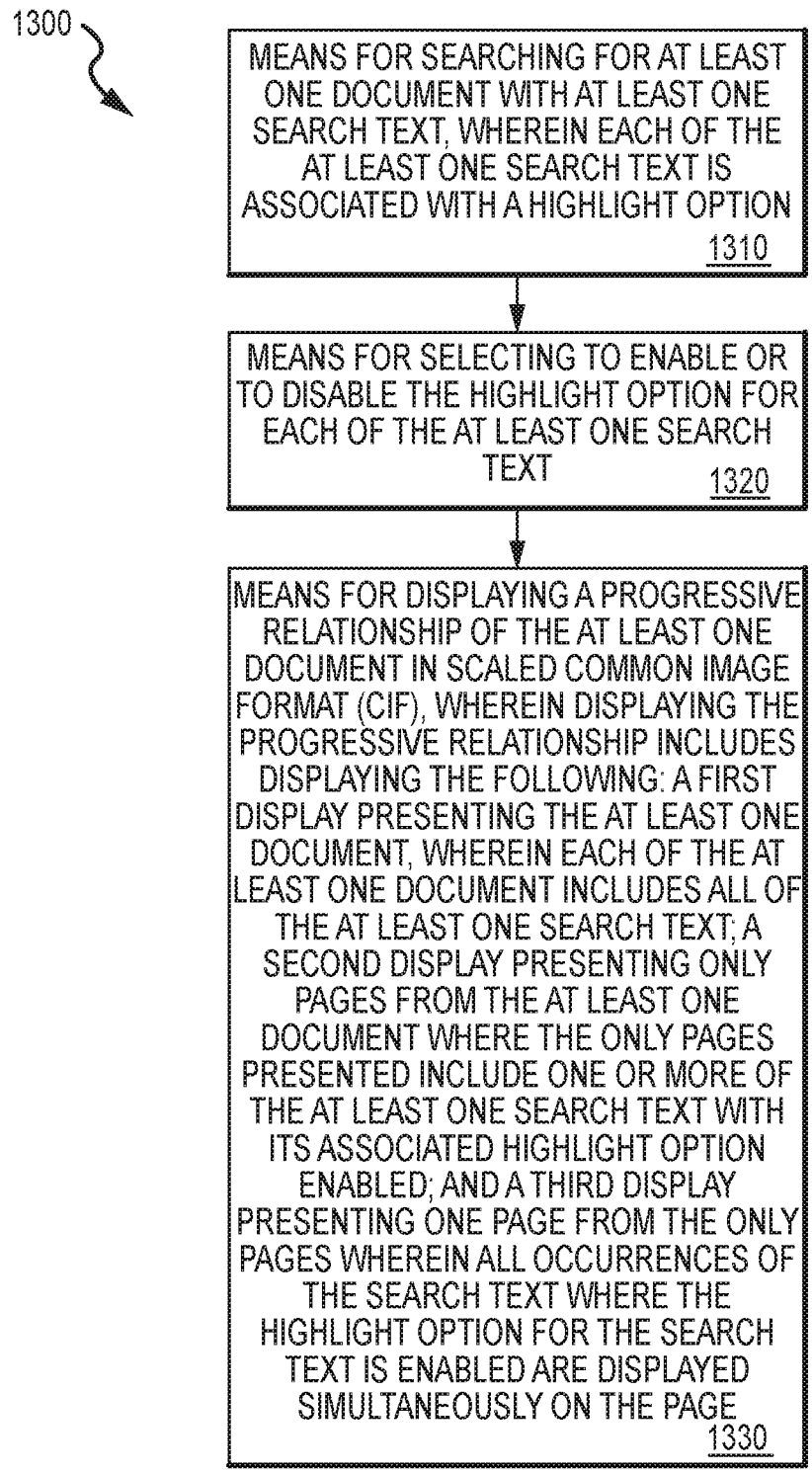
FIG. 13 illustrates an example of a device suitable for searching and displaying results using cognitive pattern recognition in the flow diagram illustrated in FIG. 12.

FIG. 13 illustrates an example of a device 1300 suitable for searching and displaying results using cognitive pattern recognition in the flow diagram illustrated in FIG. 12. In one aspect, the device 1300 is implemented by at least one processor comprising one or more modules configured to search using cognitive pattern recognition as described herein in blocks 1310, 1320 and 1330. For example, each module comprises hardware, firmware, software, or any combination thereof. In one aspect, the device 1300 is also implemented by at least one memory in communication with the at least one processor.

Figure 14A:
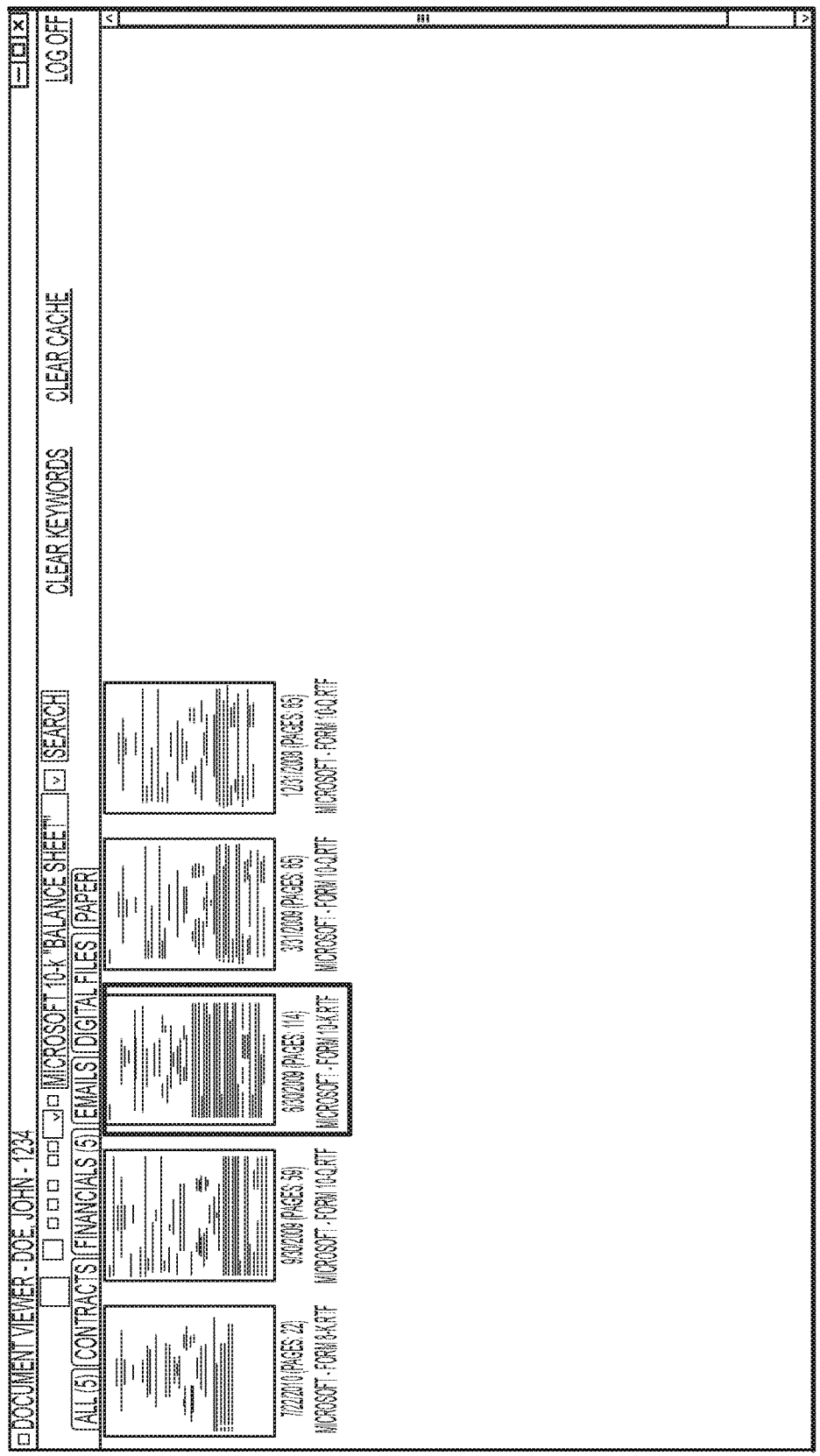
Figure 14B:
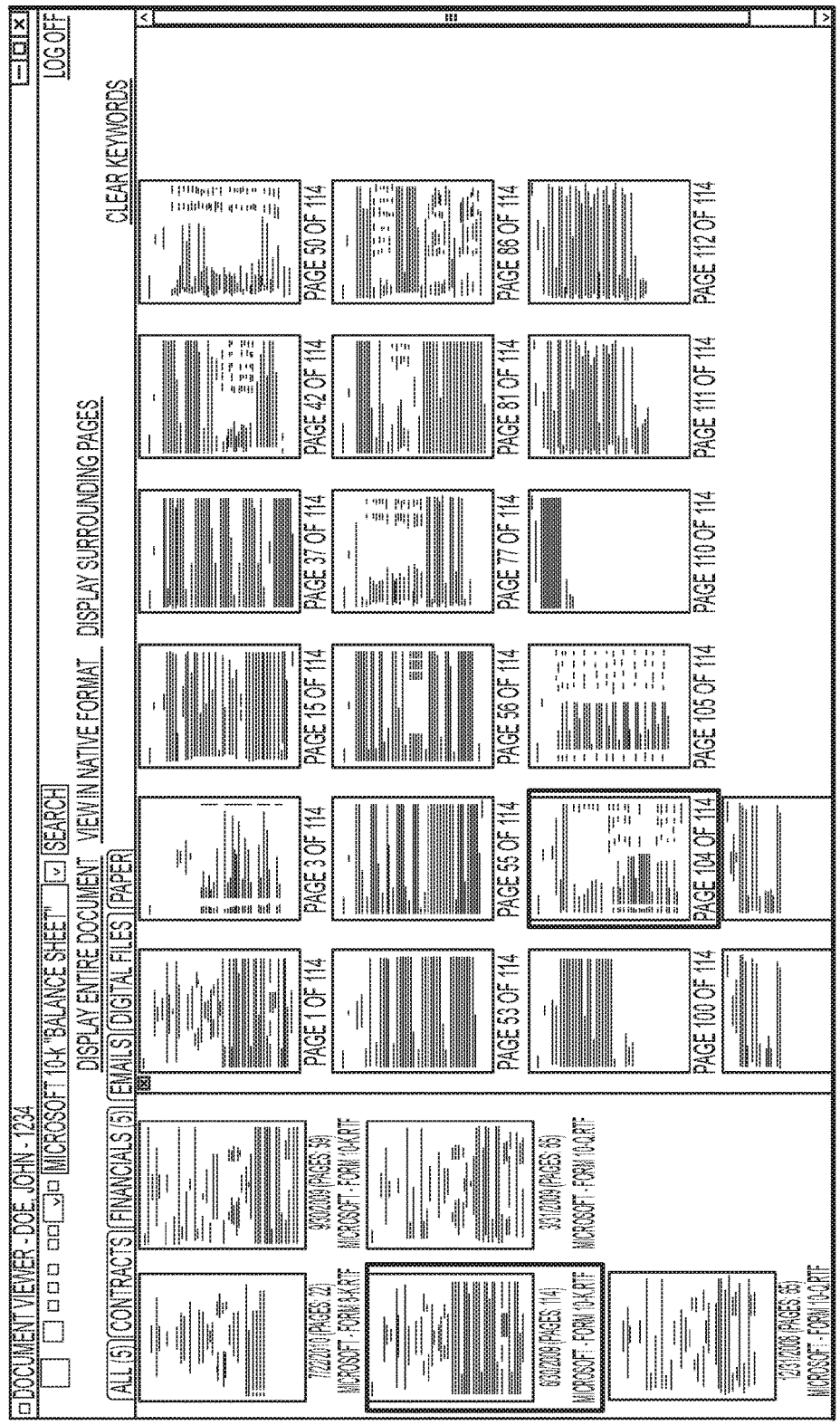
Figure 14C:
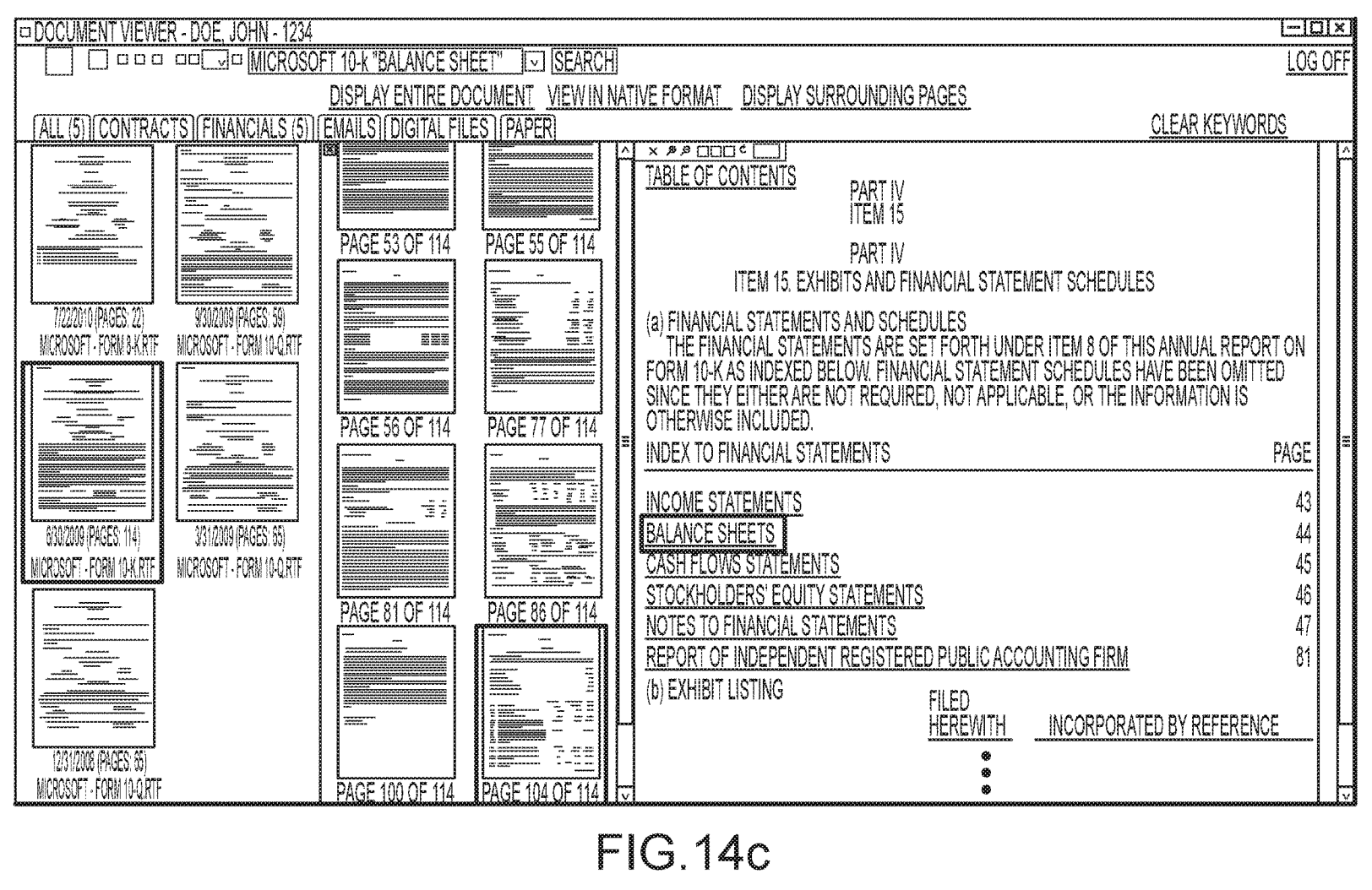

FIGS. 14*a-c* illustrate an example of a set of documents displayed from a search result in accordance with the three displays described in FIG. 12. In FIG. 14*a*, a first display is illustrated. As shown in the example of FIG. 14*a*, five documents are found in the search result. A representative page of each of the five documents is illustrated in the first display. In FIG. 14*a*, the third document is presented with a differentiation (e.g., a color border) from the remaining documents. In FIG. 14*b*, the first display is illustrated on the left side and a second display is illustrated on the right side. In the second display, some or all of the pages of the third document (presented in the first display) are presented in second display. In the example of FIG. 14*b*, one of the pages is presented with a differentiation (e.g., a color border) from the remaining pages presented in the second display. In FIG. 14*c*, the first display is illustrated on the left side, the second display is illustrated in the middle, and the third display is illustrated on the right side. In the third display, the page that is presented with a differentiation in the second display is now presented in the third display by itself. One skilled in the art would understand that although the presentation of the first, second and third displays are from left to right, that other arrangements of the displays (e.g., from top to bottom, etc.) are also within the scope and spirit of the present disclosure.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for searching and displaying using cognitive pattern recognition comprising:

searching for at least one document with at least two search texts in a database of a plurality of documents, wherein each of the at least two search texts is associated with a highlight option;
selecting to enable or to disable the highlight option for each of the at least two search texts;
displaying a progressive relationship of the at least one document, wherein displaying the progressive relationship includes displaying the following:
- a first display presenting the at least one document, wherein each of the at least one document includes all of the at least two search texts;
- a second display presenting only pages from the at least one document, wherein the only pages presented include one or more of the at least two search texts with its associated highlight option enabled; and
- a third display presenting one page from the only pages with all occurrences of the at least two search texts where each of the highlight option for the at least two search texts is enabled are displayed simultaneously on the page;
- wherein the first, second and third displays present the progressive relationship that the one page presented in the third display stems from the only pages presented in the second display and that the only pages in the second display stem from the at least one document presented in the first display, wherein the at least one document is a single document which is being displayed progressively and simultaneously.

2. The method of claim 1, wherein the at least one document does not include any document with an excluded text.

3. The method of claim 1, wherein the only pages do not include any page with an excluded text.

4. The method of claim 1, wherein the one page is selected for presenting by a user.

5. The method of claim 1, wherein the at least one document does not include any document with a first excluded text and the only pages do not include any page with a second excluded text, wherein the first excluded text is different from the second excluded text.

6. The method of claim 1, wherein the only pages are all from a single document selected from the at least one document.

7. The method of claim 6, further comprising selecting the single document from the at least one document for displaying in the second display.

8. The method of claim 7, wherein the single document is visually differentiated in the first display from the remaining documents presented in the first display.

9. The method of claim 1, wherein the one page from the only pages is visually differentiated in the second display from the remaining only pages.

10. The method of claim 1, wherein all of the at least two search texts where the highlight option is enabled are displayed simultaneously on each of the only pages.

11. The method of claim 1, wherein when the highlight option is enabled, a color differentiation is added to the at least two search text texts associated with that highlight option.

12. The method of claim 1, wherein the searching is based on one or more of the following: an attribute, an attribute range or a special definition.

13. The method of claim 12, wherein the special definition is a list of predefined synonyms.

14. The method of claim 12, wherein the special definition is a list of predefined antonyms.

15. An apparatus for searching and displaying using cognitive pattern recognition, the apparatus comprising a processor and a memory, the memory containing program code executable by the processor for performing the following:
searching for at least one document with at least two search texts in a database of a plurality of documents, wherein each of the at least two search texts is associated with a highlight option;
selecting to enable or to disable the highlight option for each of the at least two search texts;
displaying a progressive relationship of the at least one document, wherein displaying the progressive relationship includes displaying the following:
- a first display presenting the at least one document, wherein each of the at least one document includes all of the two search texts;
- a second display presenting only pages from the at least one document, wherein the only pages presented include one or more of the at least two search texts with its associated highlight option enabled; and
- a third display presenting one page from the only pages with all occurrences of the at least two search texts where each of the highlight option for the at least two search texts is enabled are displayed simultaneously on the page;
- wherein the first, second and third displays present the progressive relationship that the one page presented in the third display stems from the only pages presented in the second display and that the only pages in the second display stem from the at least one document presented in the first display, wherein the at least one document is a single document which is being displayed progressively and simultaneously.

16. The apparatus of claim 15, wherein the at least one document does not include any document with an excluded text.

17. The apparatus of claim 15, wherein the only pages do not include any page with an excluded text.

18. The apparatus of claim 15, wherein the one page is selected for presenting by a user.

19. The apparatus of claim 15, wherein the at least one document does not include any document with a first excluded text and the only pages do not include any page with a second excluded text, wherein the first excluded text is different from the second excluded text.

20. The apparatus of claim 15, wherein the only pages are all from a single document selected from the at least one document.

21. The apparatus of claim 20, wherein the memory further comprising program code for selecting the single document from the at least one document for displaying in the second display.

22. The apparatus of claim 21, wherein the single document is visually differentiated in the first display from the remaining documents presented in the first display.

23. The apparatus of claim 15, wherein the one page from the only pages is visually differentiated in the second display from the remaining only pages.

24. The apparatus of claim 15, wherein all of the at least two search texts where the highlight option is enabled are displayed simultaneously on each of the only pages.

25. The apparatus of claim 15, wherein when the highlight option is enabled, a color differentiation is added to the at least two search texts associated with that highlight option.

26. The apparatus of claim 15, wherein the searching is based on one or more of the following: an attribute, an attribute range or a special definition.

27. The apparatus of claim 26, wherein the special definition is a list of predefined synonyms.

28. The apparatus of claim 26, wherein the special definition is a list of predefined antonyms.

29. A method for searching and displaying using cognitive pattern recognition comprising:
   searching for at least one document with at least two search texts in a database of a plurality of documents, wherein each of the at least two search texts is associated with a highlight option;
   selecting to enable or to disable the highlight option for each of the at least two search texts;
   displaying a progressive relationship of the at least one document, wherein displaying the progressive relationship includes displaying the following:
      a first display presenting only pages from the at least one document, wherein the only pages presented include one or more of the at least two search texts with its associated highlight option enabled; and
      a second display presenting one page from the only pages with all occurrences of the at least two search texts wherein each of the highlight option for the at least two search texts is enabled and are displayed simultaneously on the page;
      wherein the first and second displays present the progressive relationship that the one page presented in the second display stems from the only pages presented in the first display and wherein the at least one document is a single document which is being displayed progressively and simultaneously.

30. A method for searching and displaying using cognitive pattern recognition comprising:
   searching for at least one document with at least two search texts in a database of a plurality of documents, wherein each of the at least two search texts is associated with a highlight option;
   selecting to enable or to disable the highlight option for each of the at least two search texts;
   displaying a progressive relationship of the at least one document, wherein displaying the progressive relationship includes displaying the following:
      a first display presenting the at least one document, wherein each of the at least one document includes all of the at least two search texts;
      a second display presenting only pages from the at least one document, wherein the only pages presented include one or more of the at least two search texts with its associated highlight option enabled; and
      wherein the first and second displays present the progressive relationship that the only pages in the second display stem from the at least one document presented in the first display, and wherein the progressive relationship between each of the at least one document and the only pages are displayed progressively and simultaneously.

31. An apparatus for searching and displaying using cognitive pattern recognition, the apparatus comprising a processor and a memory, the memory containing program code executable by the processor for performing the following:
   searching for at least one document with at least two search texts in a database of a plurality of documents, wherein each of the at least two search texts is associated with a highlight option;
   selecting to enable or to disable the highlight option for each of the at least two search texts;
   displaying a progressive relationship of the at least one document, wherein displaying the progressive relationship includes displaying the following:
      a first display presenting only pages from the at least one document, wherein the only pages presented include one or more of the at least two search texts with its associated highlight option enabled; and
      a second display presenting one page from the only pages with all occurrences of the at least two search texts wherein each of the highlight option for the at least two search texts is enabled and are displayed simultaneously on the page;
      wherein the first and second displays present the progressive relationship that the one page presented in the second display stems from the only pages presented in the first display and wherein the at least one document is a single document which is being displayed progressively and simultaneously.

32. An apparatus for searching and displaying using cognitive pattern recognition, the apparatus comprising a processor and a memory, the memory containing program code executable by the processor for performing the following:
   searching for at least one document with at least two search texts in a database of a plurality of documents, wherein each of the at least two search texts is associated with a highlight option;
   selecting to enable or to disable the highlight option for each of the at least two search texts;
   displaying a progressive relationship of the at least one document, wherein displaying the progressive relationship includes displaying the following:
      a first display presenting the at least one document, wherein each of the at least one document includes all of the at least two search texts;
      a second display presenting only pages from the at least one document, wherein the only pages presented include one or more of the at least two search texts with its associated highlight option enabled; and
      wherein the first and second displays present the progressive relationship that the only pages in the second display stem from the at least one document presented in the first display, and wherein the progressive relationship between each of the at least one document and the only pages are displayed progressively and simultaneously.

33. The method of claim 1, wherein the second display is displayed in a scaled common image format (CIF).

34. The method of claim 1, wherein only the second display and the third display are displayed in a scaled common image format (CIF).

35. The apparatus of claim 15, wherein the second display is displayed in a scaled common image format (CIF).

36. The apparatus of claim 15, wherein only the second display and the third display are displayed in a scaled common image format (CIF).

37. The method of claim 29, wherein the first display or the second display is displayed in a scaled common image format (CIF).

38. The method of claim 29, wherein only the first display and the second display are displayed in a scaled common image format (CIF).

39. The method of claim 30, wherein the first display or the second display is displayed in a scaled common image format (CIF).

40. The method of claim 30, wherein only the first display and the second display are displayed in a scaled common image format (CIF).

41. The apparatus of claim 31, wherein the first display or the second display is displayed in a scaled common image format (CIF).

42. The apparatus of claim 31, wherein only the first display and the second display are displayed in a scaled common image format (CIF).

43. The apparatus of claim 32, wherein the first display or the second display is displayed in a scaled common image format (CIF).

44. The apparatus of claim 32, wherein only the first display and the second display are displayed in a scaled common image format (CIF).

* * * * *